Dec. 14, 1954 R. B. PEALER 2,696,988
JAW CHUCK
Filed July 19, 1951 3 Sheets-Sheet 1

INVENTOR.
ROBERT B. PEALER
BY
Bates, Teare, & McKean
ATTORNEYS

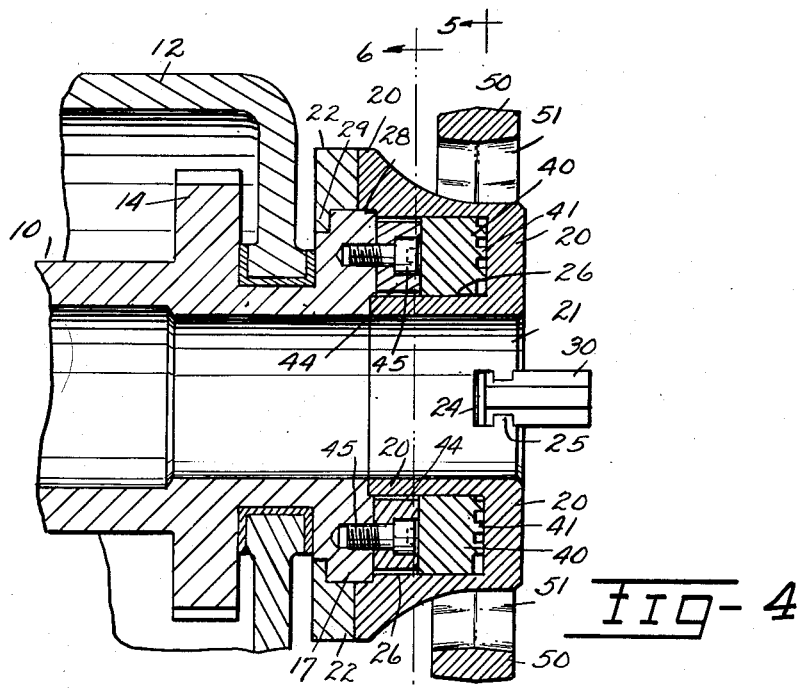
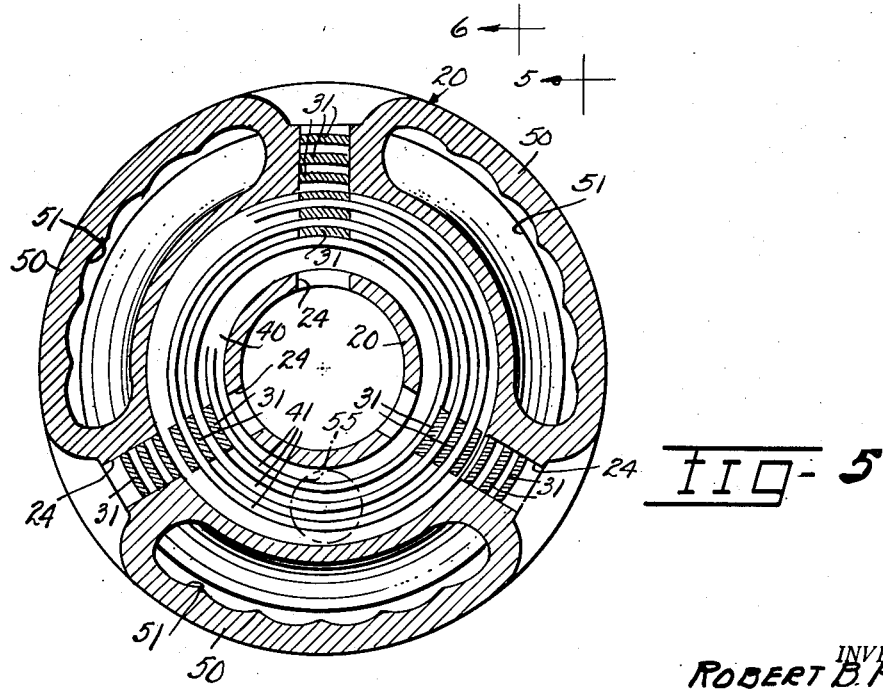
INVENTOR.
ROBERT B. PEALER
BY
Bates, Teare, v McBean
ATTORNEYS Dec. 14, 1954  R. B. PEALER  2,696,988
JAW CHUCK Filed July 19, 1951  3 Sheets-Sheet 3

INVENTOR.
ROBERT B. PEALER
BY
Bates, Teare, v McKean
ATTORNEYS

United States Patent Office 2,696,988
Patented Dec. 14, 1954

2,696,988
JAW CHUCK

Robert B. Pealer, Garrettsville, Ohio, assignor to Beaver Pipe Tools, Inc., Warren, Ohio, a corporation of Ohio Application July 19, 1951, Serial No. 237,543

14 Claims. (Cl. 279—114)

This invention relates to an improved chuck for gripping articles to be rotated, and particularly to a pipe chuck having a plurality of equi-spaced radially extending jaws which are moved into and out of pipe gripping position by a relatively rotary movement between the jaws and a coacting scroll plate or ring.

The invention is particularly concerned with an improved chuck of the type above-mentioned, wherein the jaws may be manually brought into a work-engaging position by a manual operation, as for instance, by the rotation of a hand wheel, and wherein the jaws subsequently may be forced into a work-clamping position by a hammer-like blow imparted either by the manual operation of the hand wheel, or by power applied to the driven member of the chuck. These, therefore, are the general objects of the present invention.

Other objects and advantages of this invention will become more apparent from the following description, reference being made to the accompanying drawings which illustrate one form of the invention. The essential features of the invention will be summarized in the claims.

Figure 1:
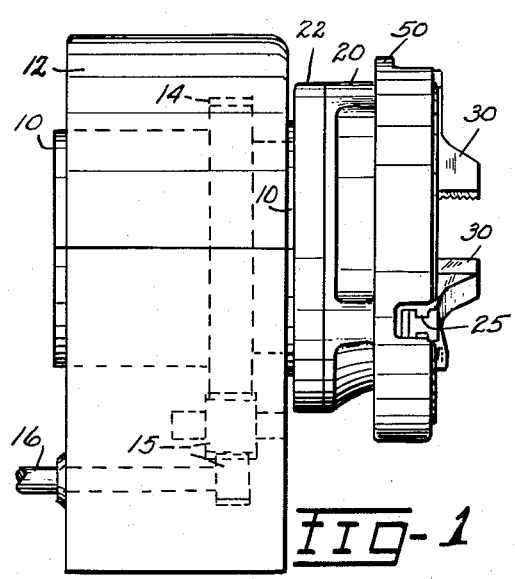
Figure 2:
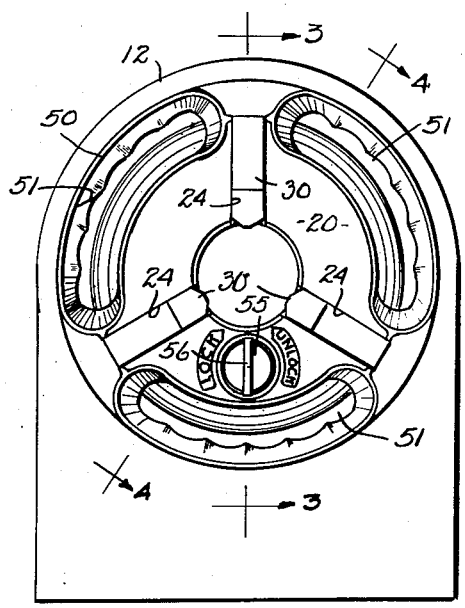
Figure 3:
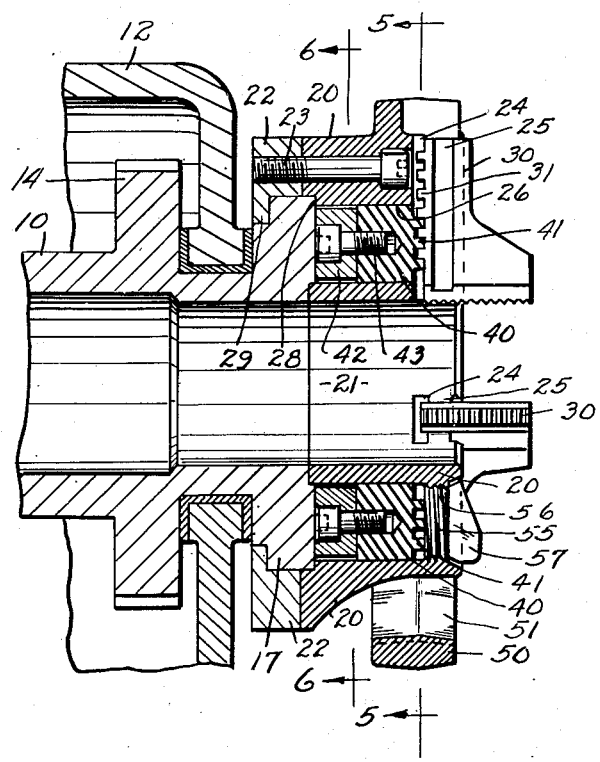
Figure 6:
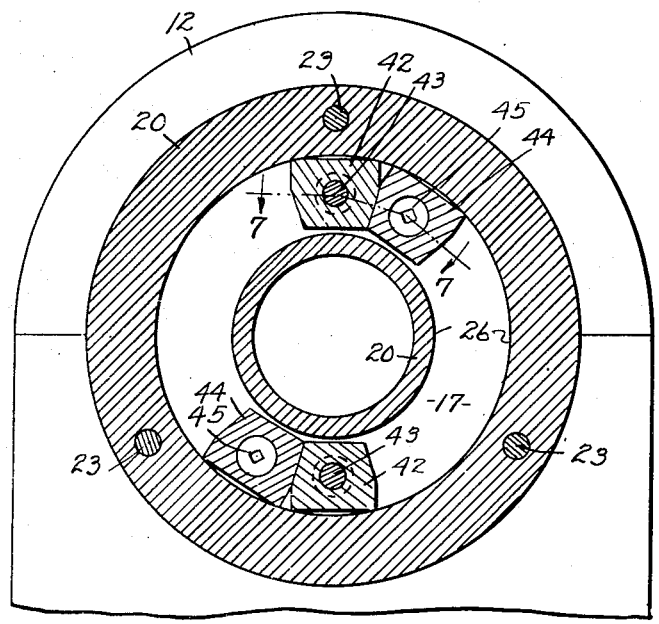
Figure 7:
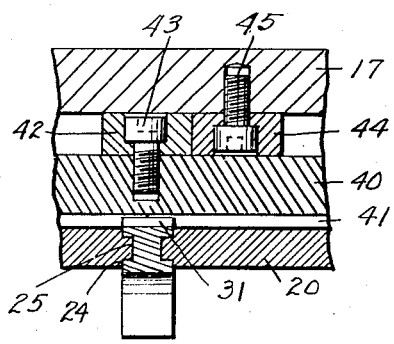

In the drawings, Fig. 1 is a side elevation of the improved chuck mounted on a power driving mechanism, and especially adapted for use in connection with pipe cutting and threading tools; Fig. 2 is a front elevation of the chuck; Fig. 3 is a vertical axially extending section on an enlarged scale, the plane of the section being indicated by the line 3—3 on Fig. 2; Fig. 4 is an axially extending section, the plane of which is indicated by the line 4—4 on Fig. 2; Figs. 5 and 6 are vertical transverse sections through the chuck, the planes of the sections being indicated by the correspondingly numbered lines on Figs. 3 and 4; and Fig. 7 is a sectional detail, the plane of which is indicated by the offset line 7—7 on Fig. 6.

In the drawings, the chuck is shown mounted on a barrel 10 which is journaled in a suitable housing 12. The chuck barrel is driven, for instance, by a spur gear 14, which is secured to the barrel and which is drivingly geared with a suitable drive shaft 16 by gearing 15. The shaft 16 is journaled in the housing 12 and is driven by a suitable power mechanism not shown. The chuck is illustrated as being mounted on a plate-like head or face plate 17 formed on one end of the barrel 10. It is contemplated that any suitable supporting and driving mechanism may be provided to support and rotate the chuck.

The chuck comprises in general, a cylindrical body or jaw carrier 20 having a central axially extending opening 21. The body 20 is rotatably mounted on the head 17 and is held in position thereon by a flanged ring 22 which is secured to the body by bolts 23. The outer face of the carrier 20 is provided with three equi-spaced radially extending slots 24 which provide guideways for respective chuck jaws 30. The jaws 30 are retained in position with their respective guideways by the usual tongue and groove arrangement 25. The inner face of the chuck body 20, which abuts the face plate 17, is provided with an annular groove or channel 26, in which a scroll plate or ring 40 is rotatably mounted. The groove 26 intersects the slots or guideways 24 so that an annular continuous raised scroll 41 formed on the outer face of the scroll plate may engage teeth 31 formed on each of the jaws 30 in the customary manner.

The scroll plate 40 is rotated to move the jaws 30 radially in their guideways 24. As illustrated the inner face of the scroll plate 40 is spaced from the outer face of the face plate 17. Secured to the inner face of the scroll plate and extending into sliding contact with the outer face of the face plate 17, are a pair of equi-spaced driving lugs 42. These lugs are shown as being secured to the scroll plate by bolts 43. A similar pair of equi-spaced lugs 44 are secured, as for instance, by bolts 45, to the outer face of the face plate 17, and extend into frictional contact with the inner face of scroll plate 40. The body 20 is provided with a shoulder 28 which engages the outer face of the head or face plate 17, while the retaining ring 22 is provided with a flange 29 which engages the inner face of the face plate, thus the body 20 is supported for rotary movement on the head, or face plate 17 and is constrained against axial movement relative thereto. The spacing between the scroll ring 40 and the face plate and body is such as will permit free rotary movement of the scroll plate relative to the body. The body 20 is provided with an annular boss or hand wheel portion 50 having a plurality of slotted openings 51 which extend through the body as shown in Figs. 3 and 4 to facilitate the gripping and rotation of the body by the operator.

A manually operable lock is provided to lock the scroll plate 40 to the chuck body 20. This lock is shown in Fig. 3, as comprising a plug 55 which is threadingly mounted in an opening 56 which extends through the face of the chuck body to enable the inner end of the plug to abut the outer face of the scroll plate 40. The plug 55 is provided with a suitable knob or handle 57 to facilitate its operation.

To operate the chuck, the operator first loosens the plug 55, and, grasping the hand wheel portion 50 of the chuck body, turns the body in a counter-clockwise direction (Figs. 5 and 6). The spindle or barrel 10 is held substantially in a fixed position by the power drive mechanism, hence this rotation results in the outward movement of the chuck jaws 30. The work is then positioned in the hollow bore of the barrel and the hand wheel rotated in a clockwise direction to bring the jaws into engagement with the work. As the hand wheel is rotated in either direction the jaw teeth 31 cause the scroll plate 40 to move as a unit with the body 20 until lugs 42 of the scroll plate engage respective lugs 44 of the face plate 17, whereupon rotary movement of the scroll plate ceases and the continued rotation of the chuck body 20 causes the jaws 30 to move radially in the guideways.

After the jaws 30 have been brought into contact with the work piece as above described, the operator manually reverses the movement of the hand wheel for approximately a quarter of the revolution, moving the lugs 42 away from their respective lugs 44, and then, with a rapid clockwise movement quickly bring the lugs 42 into contact with the respective lugs 44 thereby imparting a hammer-like blow to the scroll plate 40. This securely clamps the jaws 30 against the pipe or other work being gripped by the chuck, whereupon the power mechanism may be started and the lugs 42, 44 then will serve to drive the chuck body through the medium of the scroll plate 40.

While the clamping action may be manually accomplished as above described, it nevertheless may be power actuated. When utilizing power for the clamping operation, the operator brings the jaws 30 into engagement with the work and then reverses the hand wheel 50 as above described. Then instead of imparting the hammer blow by operation of the hand wheel 50 the operator merely energizes the power driving mechanism to cause it to rotate the barrel in a counter-clockwise direction, whereupon the chuck barrel lugs 44 will be sharply brought into engagement with the scroll plate lugs 42 and the work securely clamped in position.

When it is desired to release the work piece the power mechanism may be operated in the reverse direction, whereupon the impact between the lugs 42 and 44 will be in the opposite direction and will result in the release of the clamping pressure of the jaws on the work piece. The power drive may then be disconnected from the barrel, and the hand wheel 51 grasped by the operator and the jaws manually moved to an entirely open position.

The release of the work may also be accomplished manually. In such instance the power mechanism is rendered inactive whereupon the operator turns the hand wheel 50 sharply in a clockwise direction to secure an impact between the lugs 42 and 44, which impact loosens the chuck jaws.

Ordinarily the lock 55 may remain in an idle position. However, it is sometimes desirable to drive the chuck in a reverse or clockwise direction, as for instance, when applying left hand threads to a pipe. Under such conditions the operator, after clamping the work in the chuck, tightens the plug 55, thereby locking the head 17, the scroll plate 40 and the body 20 onto the other. Inasmuch as the scroll 41 is so designed that a hammer-like blow is required to loosen the chuck jaws, the lock 50 need only lock the parts together with such force as will cause a frictional drag between the parts and prevent sharp or hammer-like engagement between the lugs 42 and 44.

While the chuck has been described as secured to an end plate 17 formed integral with the chuck barrel 10, it is obvious that the head 16 may comprise merely a plate which may be secured to the face plate of a lathe in the usual manner.

From the foregoing description it will be seen that the improved chuck is extremely rugged, compact and provides a simple arrangement by means of which the chuck jaws may be readily clamped in position of the work under the power of a power drive mechanism and without the use of the usual chuck wrenches or the like.

I claim:

1. In a chuck, a face plate having a central opening, a jaw carrier rotatably mounted on the face plate, a scroll plate supported for rotary movements relative to the jaw carrier, a plurality of jaws mounted for radial movement in the carrier and having means inter-engaging the scroll plate whereby relative rotation between the scroll plate and the carrier moves the jaws radially and a driving connection between the scroll plate and face plate and including a lug mounted on the face plate and a coacting lug mounted on the scroll plate, and means to lock the scroll plate relative to the carrier.

2. In a chuck, a face plate adapted to be mounted for rotation about a fixed axis, a jaw carrier mounted on the plate for rotation relative to the plate and about said axis, a scroll plate supported by the jaw carrier for rotary movement about said axis relative to both the face plate and the carrier, a plurality of jaws mounted for radial movement in the carrier and having means inter-engaging the scroll plate, whereby relative rotation between the scroll plate and the carrier moves the jaws radially, a lost motion driving connection between the scroll plate and face plate, said connection comprising a pair of annularly spaced coacting lugs, one of said lugs being secured to the face plate and the other of said lugs being secured to the scroll plate.

3. In a chuck, a hollow spindle, a jaw carrier rotatably mounted on the spindle, a scroll plate supported by the jaw carrier for rotary movement relative thereto, a plurality of jaws mounted for radial movement in the carrier and having means inter-engaging the scroll plate whereby relative rotation between the scroll plate and the carrier moves the jaws radially, a driving connection between the scroll plate and the spindle including a lost motion device and manually operable means to frictionally clamp the scroll plate to the jaw carrier.

4. In a chuck, a hollow spindle, a jaw carrier rotatably mounted on the spindle, a scroll plate supported by the jaw carrier for rotary movement relative thereto and having a continuous rib on one face forming an outwardly facing continuous scroll, a plurality of equi-spaced jaws mounted for radial movement in the carrier, each jaw having rib formations inter-engaging with the rib on the scroll plate, whereby relative rotation between the scroll plate and the carrier in one direction moves the jaws radially inward and relative rotation in the other direction moves the jaws radially outward, a driving connection between the scroll plate and the spindle including a lost motion device, and manually operable means carried by the jaw carrier to clamp the scroll plate to the jaw carrier.

5. In a chuck, a hollow spindle, a jaw carrier rotatably mounted on the spindle, a scroll plate supported for rotary movement relative to the jaw carrier, a plurality of jaws mounted for radial movement in the carrier and having means inter-engaging the scroll plate whereby relative rotation between the scroll plate and the carrier moves the jaws radially, a driving connection between the scroll plate and the spindle and means to lock the scroll plate to the carrier, said means including a threaded opening extending through the face of said carrier and a lock member coacting with said threads and having an inner-face adapted to press against the scroll plate and clamp the scroll plate, spindle and carrier together as a unit.

6. In a chuck, a hollow spindle having a head mounted on one end thereof and adapted to be power driven, a jaw carrier abutting the face of said head and mounted thereon for rotary axial movement relative to the spindle, a plurality of radially extending guideways in the outer face of said jaw carrier, a chuck jaw slidably mounted in each guideway for movement to and from the axis of the spindle, said jaw carrier having an annular recess extending inwardly from its inner face and intersecting said guideways, an annular scroll plate mounted in said recess for rotation relative to the spindle and the jaw carrier and having scroll portions to engage coacting portions on respective jaws, said coacting portions being arranged to move the jaws radially consequent upon relative rotative movement between the scroll plate and the carrier, said scroll plate being of less depth than the depth of said recess, an inwardly extending lug mounted on the scroll plate and extending into said recess toward the face of said head, a similar lug secured to the outer face of said head and extending into the recess whereby rotation of the barrel will rotate the scroll plate and actuate said jaws and provide the driving connection between the carrier and the spindle.

7. In a chuck for pipe working machines, a hollow rotatable spindle having central bore and a head mounted on one end thereof, said spindle being adapted to be power driven a jaw carrier abutting the face of said head and mounted thereon for rotary movement relative to the spindle and about the axis thereof, said carrier having a central bore in alignment with the bore of said spindle, a plurality of radially extending guideways in the outer face of said jaw carrier and intersecting the bore thereof, a jaw slidably mounted in each guideway for movement to and from the axis of the spindle, said jaw carrier having an annular recess extending inwardly from its inner face and intersecting said guideways, an annular scroll plate mounted in said recess for rotation relative to both the spindle and the carrier and having scroll portions to engage coacting portions on respective jaws, said coacting portions being arranged to move the jaws radially consequent upon rotative movement between the scroll plate and the carrier, said scroll plate being of less depth than the depth of said recess, and a lost motion driving connection disposed between the scroll plate and said head to cause rotation of the head to rotate said scroll plate and to rotate said jaw carrier through the action of the scroll on the jaws.

8. In a chuck for pipe working machine and the like, a hollow spindle having a head mounted on one end thereof, a jaw carrier abutting the face of said head and mounted thereon for rotary movement relative to the axis of the spindle, a plurality of radially extending guideways formed in the outer face of said jaw carrier, a jaw slidably mounted in each of said guideways for movement to and from the axis of the spindle, said jaw carrier having an annular recess extending inwardly from its inner face and intersecting said guideways, an annular scroll plate mounted in said recess and having a scroll to engage coacting scroll portions on respective jaws, said scroll and coacting scroll portions being arranged to move the jaws radially consequent upon relative rotative movement between the scroll plate and the carrier, said scroll plate being of less depth than the depth of said recess thereby providing an annular space between the scroll plate and said head, an inwardly extending lug mounted on the scroll plate and extending into said space, a second lug mounted on the head and extending into said space, said lugs being annularly spaced one from the other, and means to selectively clamp the scroll plate, head and carrier together for rotation as a unit.

9. In a chuck, a driven member, a scroll plate and a jaw carrier mounted for rotary movement about a common axis relative to each other and relative to the driven member, a plurality of spaced jaws mounted for radial movement in the carrier, a scroll on said scroll plate, means on each jaw inter-engaging said scroll whereby relative rotation between the scroll plate and the carrier moves the jaws radially, means including spaced lugs to limit the relative rotation between the driven member and the scroll plate, and wherein said scroll and inter-engaging means limit the rotation between the scroll plate and the jaw carrier consequent upon engagement of the jaws with an axially positioned work piece.

10. In a chuck, a driving member, a scroll plate and a jaw carrier mounted for rotary movement relative to each other and to the driving member about a common axis, a plurality of spaced jaws mounted for radial movement in the carrier, a scroll on said scroll plate, means on each jaw inter-engaging said scroll whereby relative rotation between the scroll plate and the carrier moves the jaws radially, means including a pair of spaced lugs to limit the relative rotation between the driven member and the scroll plate, one of said lugs being mounted on the scroll plate and the other on the driven member, wherein said scroll and said inter-engaging means is adapted to limit the rotation between the scroll plate and the jaw carrier consequent upon engagement of the jaws with an axially positioned work piece, and a hand grip on the carrier whereby the carrier may be manually rotated relative to the driven member.

11. In a chuck, a driven member, a scroll plate, and a jaw carrier mounted for rotary movement relative to each other and to the driving member about a common axis, a plurality of spaced jaws mounted for radial movement in the carrier, a scroll on said scroll plate, means on each jaw inter-engaging said scroll whereby relative rotation between the scroll plate and the carrier moves the jaws radially, means to limit the relative rotation between the driven member and the scroll plate to a predetermined maximum, and said scroll, and wherein said inter-engaging means is adapted to limit the rotation between the scroll plate and the jaw carrier consequent upon engagement of the jaws with an axially positioned work piece, and manually operable means to selectively prevent relative rotation between the carrier and scroll plate.

12. In a chuck, a face plate, a jaw carrier rotatably mounted on the face plate, a scroll plate supported for rotary movement relative to both the jaw carrier and the face plate, a plurality of jaws mounted for radial movement in the carrier and having means inter-engaging the scroll plate whereby relative rotation between the scroll plate and the carrier moves the jaws radial, and a lost motion driving connection between the scroll plate and the face plate.

13. In a chuck, a live machine spindle element, a jaw carrier rotatably mounted on said element, a scroll plate supported by said carrier for rotary movement relative to both the spindle element and the jaw carrier, a plurality of jaws mounted for radial movement in the carrier and having means inter-engaging the scroll plate whereby relative rotation between the scroll plate and the carrier moves the jaws radially, and means to cause rotation of the live spindle to impart a hammer like blow to the scroll plate and to establish a driving connection therebetween, said means including a lug on the live spindle element and a coacting lug on the scroll plate.

14. In a chuck, a rotatable driven member adapted to be power driven about a fixed axis, a hollow jaw carrier mounted on the driven member for rotation about said axis, a scroll ring mounted within the jaw carrier for rotary movement about said axis, relative to said driven member and said carrier, a plurality of equi-spaced jaws mounted for radial movement in the carrier and having means inter-engaging the scroll plate whereby relative rotation between the scroll plate and the carrier moves the jaws radially, a lost motion driving connection between the scroll plate and said driven member, said connection comprising two pairs of coacting annularly spaced lugs, one pair of said lugs being secured to said driven member and projecting toward the scroll plate, the other pair of said lugs being secured to the scroll plate and projecting toward the driven member, and wherein the carrier is driven from the driven member through lost motion connection, the scroll plate, the interengaging means and the jaws.

References Cited in the file of this patent

UNITED STATES PATENTS

| Number | Name | Date |
|---|---|---|
| 1,548,949 | Horton | Aug. 11, 1925 |
| 1,699,359 | Hay | Jan. 15, 1929 |
| 1,764,289 | Emrick | June 17, 1930 |
| 2,101,926 | Wettig | Dec. 14, 1937 |
| 2,429,524 | Oetzel | Oct. 21, 1947 |
| 2,588,938 | Rogers | Mar. 11, 1952 |